Aug. 11, 1964 R. C. TRESEDER 3,144,642

RANDOM ACCESS FILE WITH STATIONARY RECORDS

Filed Dec. 30, 1960 3 Sheets-Sheet 1

INVENTOR.
ROBERT C. TRESEDER,

BY Hansen and Lane

ATTORNEYS.

Aug. 11, 1964 R. C. TRESEDER 3,144,642

RANDOM ACCESS FILE WITH STATIONARY RECORDS

Filed Dec. 30, 1960 3 Sheets-Sheet 2

INVENTOR.
ROBERT C. TRESEDER,
BY Harness and Lane
ATTORNEYS.

RANDOM ACCESS FILE WITH STATIONARY RECORDS

Filed Dec. 30, 1960 3 Sheets-Sheet 3

INVENTOR.
ROBERT C. TRESEDER,
BY Hanson and Lane
ATTORNEYS.

United States Patent Office 3,144,642
Patented Aug. 11, 1964

3,144,642
RANDOM ACCESS FILE WITH STATIONARY RECORDS

Robert C. Treseder, San Jose, Calif., assignor to International Business Machines Corporation, New York, N.Y., a corporation of New York
Filed Dec. 30, 1960, Ser. No. 79,626
9 Claims. (Cl. 340—174.1)

The present invention relates to electronic data processing mechanism, and pertains more particularly to a random access file for use with such mechanism.

It is common practice in data processing machines to employ, in the so called "random access file" thereof, magnetic records comprising tapes, discs or drums of non-magnetic material coated with a thin layer of magnetic material such as, for example, iron oxide. These records are driven, either rotatively or in a straight line, past a transducer head, which either transmits or receives data bits on the magnetic record coating.

The present invention provides means for selecting one of a plurality of magnetic coated records, and the positioning of such selected record in fixed, accurately centered position, adjacent a transducer head traveling in an orbit and in operative relation to such record.

The invention also provides means for selecting a desired one of a plurality of magnetic records, each having a plurality of track zones thereon, of bringing such selected record into operative position over a rotor, of accurately centering such record relative to the axis of rotation of said rotor, and of bringing one of a plurality of transducers mounted on such selected rotor into accurate register with a selected track zone of such record.

A further object of the invention is to provide storage means for a plurality of records, each having a plurality of track zones thereon, with means for transferring a selected record from the storage means into initially spaced relation to a plane defined by a transducer moving in an orbit about an axis, of accurately centering the record relative to the orbital axis of the transducer, and of bringing the orbiting transducer into close, accurate register with a selected record track zone located at a selected radial distance from such orbital axis.

A further object of the invention is to provide an improved random access file employing stationary records and one or more transducers moving in orbit co-axially of such record.

These, and other objects and advantages of the invention, will be apparent from the following description and the accompanying drawings, which show an exemplary embodiment of the invention. In the drawings.

Figure 7:
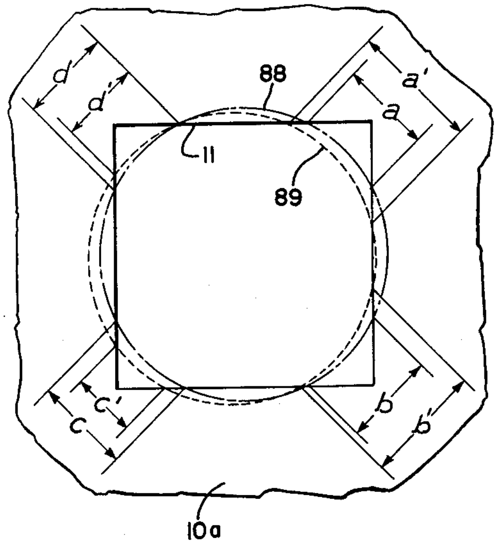

FIG. 7 is an enlarged, fragmentary, plan view of the central zone of one of the records with a centering hole therein, the circular path of an orbiting light beam at the plane defined by the record being shown in dash-dot line as it appears relative to the square central hole of the record when the latter is centered over the rotor, the dotted line circle showing the path of such light beam when the record is not so centered, the radiating lines showing the zones at the corners of the hole wherein the light beam is not intercepted by the record.

Figure 8:
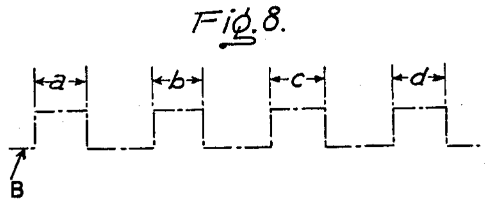

FIG. 8 is a graph showing the electrical pulses generated by the uniform successive illumination of a plurality of current generating photo-cells by the rotating light beam when a record is centered relative to the axis of light beam rotation, as indicated by the dash-dot line circle of FIG. 8.

Figure 9:
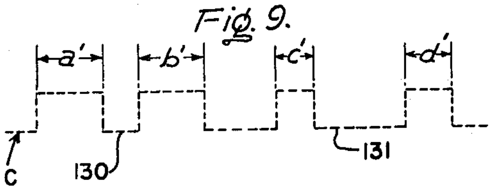

FIG. 9 is a similar graph showing the pulses generated by the non-uniform illumination of the same photo-cells when the record is not in centered position, relative to the axis of light beam rotation, as indicated by the dotted line circle of FIG. 8.

Figures 1, 11:
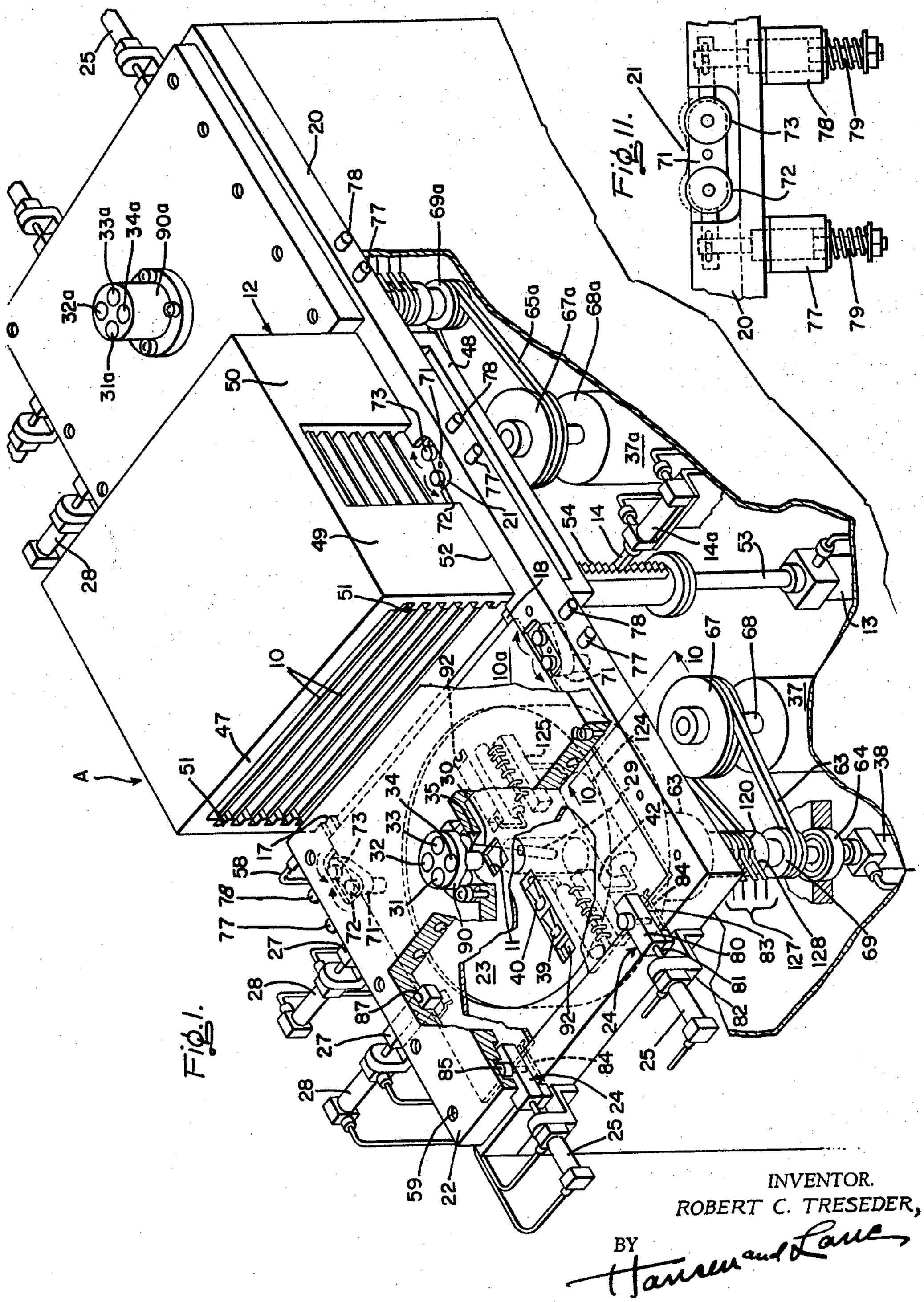
FIG. 1 is a fragmentary, perspective view showing the upper portion of a random access mechanism embodying the invention, portions thereof being shown somewhat diagrammatically, and other portions being broken away.
Figure 10:
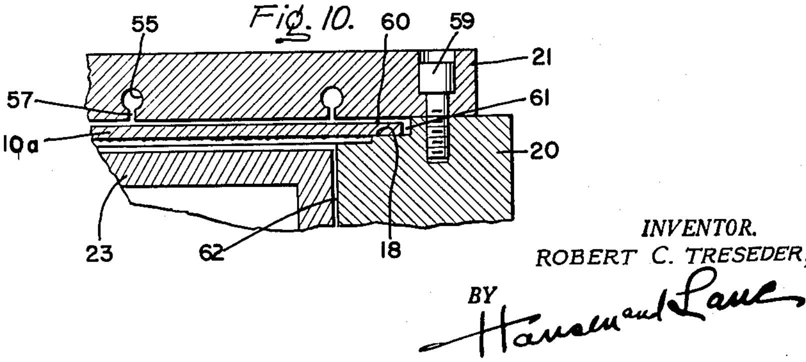

FIG. 10 is an enlarged, fragmentary sectional view taken along line 10—10 of FIG. 1, and showing the record in its lowered position.

FIG. 11 is a view of the drive wheel assembly.

Referring briefly to the drawings; in an illustrative embodiment A of the invention shown in FIG. 1, a plurality of records 10, which may be of magnetic coated sheet material with a non-circular hole 11 centrally of each thereof, are stored, shelf-like, in a vertically adjustable record magazine 12. A hydraulic cylinder 13 and a hydraulically actuated detent 14 are provided to bring a selected one of the records 10 into lateral alignment with a pair of record transfer tracks 17 and 18 provided on a bed plate 20.

A plurality of record transferring friction drive wheel assemblies 21 are mounted on each side of the bed plate 20 for transferring a selected record, for example, the record 10*a*, along the tracks 17 and 18 into operative position between a platen 22 and a transducer carrying rotor 23.

For centering such selected record 10*a* relative to the axis of rotor rotation, a pair of record gripping jaws 24, controlled by fine adjusting means, such as, for example, hydraulic cylinders 25, are provided on the outer end of the bed plate 20, and a similar pair of gripping jaws 27 with control cylinders 28 are also provided on a side of the bed plate.

A light beam projector 29, constructed to project a small diameter pencil beam of light 30 is so mounted in the rotor 23 that when the latter is rotating, the projected light beam 30 will describe a surface of rotation co-axial with the rotor, and will be intermittently intercepted by marginal portions of a record 10*a* surrounding the central hole 11 therein.

Four downwardly directed, current generating photo-cells 31, 32, 33 and 34 are mounted over a central opening 35 in the platen 22 and are positioned to be successively illuminated by the rotating light beam. When the succesisve electrical current pulses generated by the photo-cells are uniform, as indicated by the graph B of FIG. 8, this indicates that such record is centered relative to the axis of rotor rotation. When the pulses are not uniform, as in the graph C of FIG. 9, it indicates that such record is not so centered.

The rotor 23 is driven at a constant speed during operation of the machine A by a drive motor 37, and is moved between a lowered, retracted position, as shown in FIGS.

Figures 3, 4:
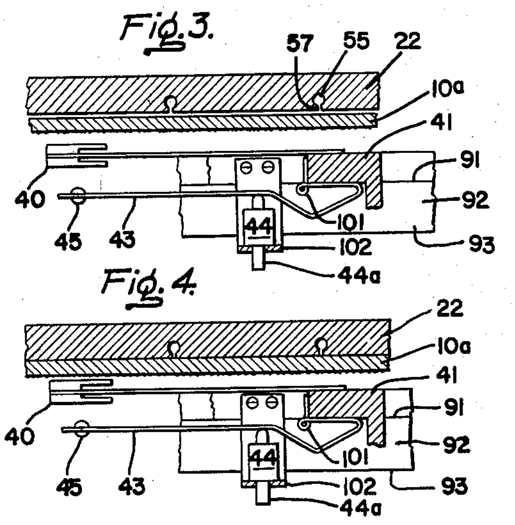
FIG. 3 is an enlarged, fragmentary, vertical, sectional view through the rotor top and overlying platen of FIG.. 1, a record being shown positioned in the space therebetween, the parts being shown with the rotor in its lowered, inoperative position.
FIG. 4 is a view similar to FIG. 3, but with the platen passages vacuumized to draw the record into close, overall engagement therewith, and with the rotor elevated to a position closely adjacent the record.
Figure 5:
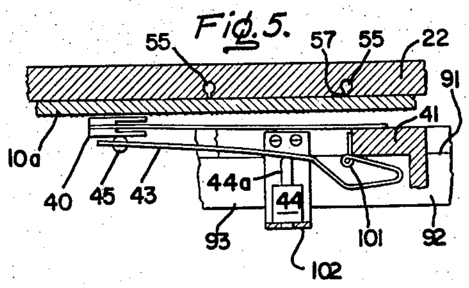
FIG. 5 is a view similar to FIG. 4, but with the transducer biasing spring swung upwardly by its associated solenoid.

1, 3 and 8, and an elevated, operative position as shown in FIGS. 4 and 5, by means of a hydraulic cylinder 38 FIG. 1.

Figure 2:
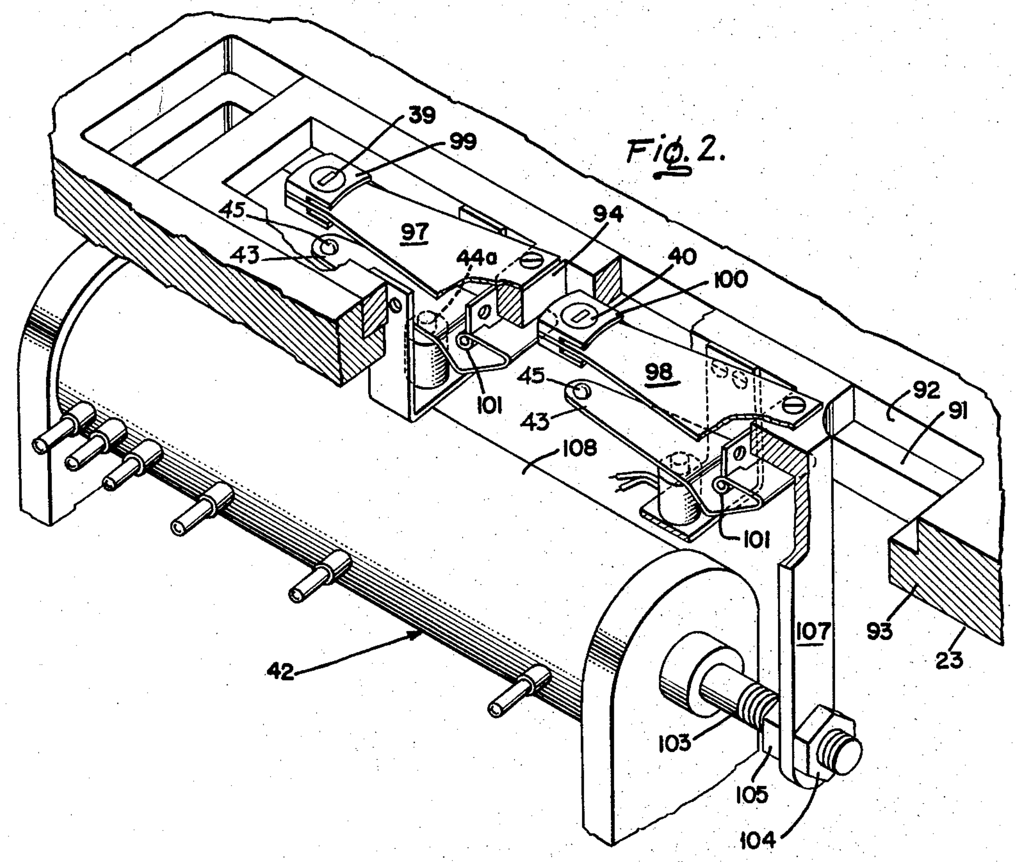
FIG. 2 is an enlarged, fragmentary, perspective view of a portion of the rotor shown in FIG. 1, and showing a pair of the transducers mounted in said rotor, together with a cylinder adder for positioning the transducers at selected distances from the axis of rotor rotation, portions being broken away.

A plurality of transducer heads, such as, for example, the two 39 and 40 shown in FIGS. 1 and 2, are mounted in a frame 41 for adjustment radially of the rotor 23. Such radial adjustment of the heads is provided by suitable means, such as a conventional piston adder 42, a diagrammatic sectional illustration of which is shown in FIG. 7. Transducer biasing springs 43, mounted one beneath each transducer, are swung upwardly by solenoids 44, provided one beneath each transducer support spring 43, to bring a bearing ball 45 in the outer end of each of said springs into upwardly biasing engagement with its associated transducer to thereby urge the latter into close, air bearing relation with a centered record 10*a*.

In using the machine A, the magazine 12 is vertically positioned to align a selected record 10*a* therein with the record transfer tracks 17 and 18. Such selected record is transferred along the tracks 17 and 18 to operative position between the rotor 23 and the platen 22. The grippers 24 and 27 center the record over the rotor 23 under the guidance of the rotating light beam 30 in the record center hole 11. The centered record is then sucked into close, contacting relation with the platen 22, the rotor 23 is elevated to a position closely adjacent the platen, the transducer heads 39 and 40 are adjusted radially of the rotor 23 to scan selected track zones of the selected record, and are then biased by the solenoids 34 into close, air bearing relation with the record to receive or transmit required data on the record. The parts are then returned to their starting positions, and the record is returned to the magazine, by a reversal of the above steps.

Referring to the drawings in greater detail, the records 10 employed in the illustrated form of the invention are of suitable material, such as, for example, non-magnetic sheet material such as aluminum or plastic of adequate thickness, and are coated on their under sides with suitable magnetic material, such as, for example, iron oxide. The top and bottom surfaces of each record are flat, substantially parallel, and the under surface thereof at least is extremely smooth, since the transducer heads operate in close proximity to the record surface and any surface irregularity might cause undesirable contact between the record and the transducers. The center hole 11 in each record, and which, in the illustrated records, is square, is preferably made with extreme accuracy, and the holes in all of the records preferably are uniform.

The records 10 are supported at their side edges in horizontal, parallel, spaced relation in the magazine 12. The latter comprises a top plate 47 and a similar bottom plate 48 firmly interconnected by two side plates 49 and 50 on each side thereof. The magazine side plates are provided with record receiving notches 51 on their inner sides, and are mounted for vertical, slidable movement in an opening 52 provided therefor in the bed plate 20.

The magazine 12 is mounted on the upper end of the piston rod 53 of the magazine positioning hydraulic cylinder 13. The controls (not shown) for operating this hydraulic cylinder 13, like the other operating controls of the illustrated embodiment A of the present invention, may be conventional, and operated either by hand or by suitable electrical or electronic control mechanism arranged in any one of numerous ways well within the capabilities of a routine worker or designer familiar with business and data processing mechanism. Since such control mechanisms are not a feature of the present disclosure, however, and since they will be designed in accordance with the individual requirements of each type of machine embodying the present invention, such controls are not illustrated or described in detail herein. For the purpose of the present description, therefore, it will be assumed that conventional hand controls are employed.

A V-toothed rack 54 mounted lengthwise of the upper end of the magazine supporting piston rod 53 has the teeth thereof spaced apart by the same distance as the record notches 51 in the magazine 12. The rack 54 is engaged by the detent 14 when the latter is advanced into contact with the rack 54 by its hydraulic cylinder 14*a* to align a corresponding record in the magazine 12 with the record transferring tracks 17 and 18.

In addition to the rotor 23, platen 22 and other operative elements illustrated on the left hand end of the machine A of FIG. 1, a second similar platen 22*a*, together with the other operative elements shown at the left in FIG. 1, are also provided on the right hand side of said machine. By this arrangement, while one record is being processed beneath the left hand platen 22, another record may be transferred into operative position beneath the right hand platen 22*a*. Since the two end portions of the machine are identical, the details of the left hand end portion only will be described in detail herein. Corresponding right hand portions of the machine will be identified by the same reference numerals as their left hand counterparts with the suffix "*a*" added.

The platen 22 may be a heavy, rigid, metal member, such as, for example, a steel plate or casting, with its under surface flat, smooth, and perpendicular to the axis of rotation of its associated rotor 23. A plurality of vacuum passages 55 are provided in the platen 22, and these passages communicate, through numerous openings 57, with the portion of the underside of the platen beneath which a record 10*a* is positioned for processing.

A vacuum line 58 communicates these vacuum passages in the platen with suitable vacuum-producing means, such as, for example, a conventional vacuum pump, not shown. When the platen passages 55 are vacuumized, air is withdrawn through the surface openings 57, thereby reducing the air pressure between the platen 22 and a closely underlying record 10*a*, whereupon the atmospheric pressure on the bottom of such record forces it upwardly into close, overall contact with the under surface of the platen as shown in FIG. 5.

The platen 22 is secured to the bed plate 20 by a plurality of screws 59, which may be conventional, recessed head die screws. The bed plate 20, like the platen 22, is preferably of heavy, rigid metal, and the record transfer tracks 17 and 18 may be machined from the material of the bed plate itself. Betwen the record tracks 17 and 18 the bed plate 20 is preferably recessed as at 60 (FIG. 10) to provide adequate clearance from the under surface of a selected record 10*a* when the latter is being transferred into and out of operative position along the tracks. Sufficient lateral clearance is provided, as at 61 (FIG. 10), between the side edges of a record 10*a* and the edges of the bed plate 20 on the outer sides of the tracks 17 and 18 to permit final accurate centering of such record relative to the axis of rotor rotation. Actually, such lateral clearance need be only very small, since such record will be positioned within a few thousandths of an inch of its centered position when it is transferred into operative position beneath the platen 22.

The rotor 23 is mounted with free rotary clearance in a circular hole 62 provided therefor in the bed plate 20. The rotor 23 comprises a hollow, drum-like top portion 23*a* secured co-axially to a downwardly extending, tubular support shaft 23*b*. The latter is journaled at its upper end in a bearing 63 secured to the bed plate 20, and also at its lower end in a second bearing 64. The rotor 23 is rotatively driven by suitable means, such as the drive motor 37, by means of a V-belt 65 passed around a grooved pulley 67 secured to the motor shaft 68, and a second grooved pulley 69 secured to the rotor shaft 23*b*. The rotor drive motor 37 may be provided with suitable, conventional, speed control gearing, not shown, to provide a desired speed of rotor rotation.

The rotor 23 is movable a short distance axially thereof by means of a hydraulic cylinder 38 acting on the lower end of the rotor shaft 23*b*. Actuation of the hydraulic cylinder 38 moves the rotor 23 axially thereof between its lowered, inoperative position (FIGS. 1, 3 and 10), and its elevated operative position (FIGS. 4 and 5).

The transfer of a selected record 10a from the magazine 12 into operative position beneath the platen 22 and back again is accomplished, in the illustrated form of the invention, by two laterally oppositely positioned pairs of identical drive wheel assemblies 21 (FIG. 1). Each drive wheel assembly 21 comprises an elongated base member 71, with a pair of record transferring drive wheels 72 and 73 journaled at opposite ends thereof. Each pair of drive wheels 72 and 73 is driven by means of an individual electric motor 74 operating through conventional gearing, not shown, to turn in opposite directions, as indicated by the arrows associated therewith in FIG. 1. The periphery of each drive wheel is of a material having a high co-efficient of friction, for example, vulcanized rubber.

Each drive wheel assembly 21 is pivotally mounted centrally thereof in a recess provided therefor in the bed plate 20, with the drive wheels 72 and 73 thereof positioned laterally opposite the side edges of a record 10a positioned for transferring into and out of operative position beneath the platen 22.

The base members 71 are biased, by springs encircling the cores of a pair of actuating solenoids 77 and 78 so as to be normally positioned with their major axes parallel to the side edges of the records 10 in the magazine 12, in which position both drive wheels 72 and 73 of each assembly 21 are spaced from the edges of a laterally adjacent record 10.

Suitable drive actuating means, such as a pair of the solenoids 77 and 78, are provided for swinging the bases 71 to bring a selected drive wheel of each assembly 21 into frictional, driving engagement with the edges of a record positioned adjacent thereto. Each solenoid 77 and 78 has a core extension 79 thereof mounted with its inner end bearing against an end of one of the bases 71. A spring 79a on each core extension 79 urges both solenoids toward their balanced, unactuated position. Actuation of one set of solenoids, for example, all of the solenoids 77, swings the assemblies 21 to bring all of their wheels 72 into driving engagement with a record laterally adjacent thereto, to transfer such record in one direction, while actuation of the other set of solenoids 78 swings the bases in the opposite direction to transfer such record in the opposite direction.

The two pairs of gripper jaws 27 and 28 for accurately centering a selected record 10a relative to the axis of rotor rotation after such record has been transferred from the magazine 12 into operative position beneath the platen 22 are located at the end and side, respectively, of the bed plate 20. Each pair of gripper jaws comprises an upper jaw 80 fixedly secured to the piston rod 81 of its associated hydraulic cylinder 25. Each of the latter is mounted on a bracket 82 secured to the bed plate 20. A notch 83 is formed in the under side of each upper jaw 80, and, in the case of the end jaws 24, such notches act as stops to arrest a selected record 10a transferred thereto along the tracks 17 and 18. The upper faces of the notches 83 are on the same plane as the bottom surface of the platen 22.

A movable lower jaw 84 of magnetically permeable material, such as soft iron, is hingedly connected at its outer end to each fixed upper jaw 80, and normally gravitates downwardly to open position, in which position it clears the under side of a selected record 10a when the latter is transferred into operative position between the jaws. An electro-magnet 85 is provided in each fixed upper jaw 80 and, when energized, biases the associated lower jaw 84 upwardly into gripping relation with a selected record 10a positioned between the jaws. The pairs of gripping jaws 24 and 26 are bodily movable lengthwise thereof in notches 87 provided therefor in the platen 22 and bed plate 20 to provide operative clearance for the gripper jaws and their magnets during a record centering operation.

The light beam projector 29 for projecing the small diameter, parallel ray light beam 30 is of a well known type, and it is, therefore, unnecessary to illustrate or describe it in detail herein. The projector 29 is so mounted in the rotor 23 that the light beam 30 projected thereby describes a surface of rotation, which, at the plane of a record in operative position beneath the platen 22, describes a circle having a diameter somewhat less than the maximum width of the record hole, and, when not intercepted by such record, illuminates the photo-cells 31, 32, 33 and 34 during successive quadrants of its orbit. Suitable pulse detecting means, such as a conventional oscilloscope, not shown, may be employed to check the relative durations of the pulses generated by the photo-cells.

When the circle described by the light beam at the plane of such record is concentric with the center hole in the record, as illustrated by the dash-dot circle 88 of FIG. 7, the zones *a*, *b*, *c* and *d* (FIG. 7) at the corners of said hole where the light beam is not intercepted will be uniform, as will the pulses created thereby by the photo-cells. Such uniform pulses are illustrated as the elevated portions *a*, *b*, *c* and *d* of the graph B of FIG. 8. When such described circle is not concentric with the record hole, as illustrated by the dotted line circle 89 of FIG. 7, the successive corner zones *a'*, *b'*, *c'* and *d'* (FIG. 7) where the light beam is not intercepted will not be uniform, as illustrated by the elevated portions of the graph C of FIG. 9.

The four photo-cells 31, 32, 33 and 34 are arranged symmetrically about the rotor axis within an inverted, cup shaped housing 90 secured marginally around the central hole 35 in the platen 22, and are directed downwardly toward the source of the light beam 30 so as to be illuminated during successive quadrants of its orbit.

By means of the record gripping jaws 25 and 27 and their respective actuating means, such as the gripping magnets 85 and the hydraulic cylinders 25 and 27 (FIG. 1), a record 10a in operative position beneath the platen 22 can be moved longitudinally and laterally as required to bring the graph C of FIG. 9 into conformity with that B of FIG. 8, in which condition the record will be centered co-axially of the rotor 23. This accurate centering of each record is necessary, since the track on a record described by a rotating transducer is only a few thousandths of an inch in width, and the slightest eccentricity of a record relative to the path of these heads would jeopardize the performance of the machine.

The illustrated pair of transducers 39 and 40 (FIGS. 1 and 2) is mounted in the elongated, rectangular frame 41, which, in turn, is supported for slidable movement radially of the rotor 23 on a pair of flanges 91 provided one along each side of a radially elongated opening 92 in the rotor top plate 93.

A central transverse frame member 94 is provided in the frame 41, and a pair of thin, light weight, flat, outwardly tapered, transducer supporting springs 97 and 98 are secured by their inner ends, one to the inner end portion of the frame 41, and the other to the transverse frame member 94. Transducer support members 99 and 100 are attached to the outer end of the springs 97 and 98, respectively, and the transducers 39 and 40 are mounted in their support members with their upper surfaces conforming with those of their respective support members. The surface of each transducer support member and that of its transducer on the side thereof toward a record 10a, are curved convexly in a well known manner to provide air bearing support for the transducer and its support member as they traverse such record.

The transducer biasing springs 43, mounted one beneath each of the transducer support springs 77 and 78, are hingedly connected at their lower ends 101 to the transducer support frame 41. The balls 45 are mounted one in the outer end of each of the underlying springs 43, and each ball 45 is centered beneath its associated transducer support member 100, 101.

Each transducer biasing solenoid 44 is mounted on a U-shaped support member 102 secured to the frame 41, and extends transversely beneath its associated biasing spring 43. The latter are supported outwardly from their hinged connections 101 to the frame 41 by the core members 44*a* of the solenoid 44. Actuation of the solenoids 44 swings the outer ends of the springs 43 upwardly, causing the balls 45 to engage the under sides of their respective transducer support members 99 and 100, to thereby bias their respective transducers 39 and 40 into close, air bearing relation with a selected record 10*b*.

The sequence of operations for bringing a transducer, for example the transducer 39, into air bearing relation with a selected record 10*a* from the time the latter is transferred into operative position beneath the platen 22 is illustrated consecutively in FIGS. 3, 4 and 5. FIG. 3 shows the position of the transducer assembly after such record has been fed into operative position beneath the platen 22, in which position the record is preferably centered as described previously herein, and the transducers are adjusted radially of the rotor 23 in a manner to be described later herein. FIG. 4 is a similar view showing the rotor elevated to bring the transducer assembly closer to such record, and also shows the record sucked into close, contacting relation with the platen by vacuumizing the passages 55 in the platen. FIG. 5 is a similar view showing the transducer biasing solenoids 44 actuated to swing the outer ends of the transducer biasing springs 43 upwardly, thereby to bring the balls 45 into engagement with the under sides of the transducer support members 99 and 100 and thus to bias the transducers 39 and 40 therein into close, air bearing supported relation with such record.

For adjusting the transducers 39 and 40 radially of such record, the conventional piston adder 42 is mounted beneath each transducer support frame 41 with its axis extending radially of the rotor 23 directly beneath the major axis of its associated transducer support frame 41. The threaded outer end of the piston rod 103 of each adder 42 is connected in axially adjusted position by nuts 104 and 105 to a bracket arm 107 formed integrally with, and extending downwardly from, the inner end of its associated transducer support frame 41.

Figure 6:
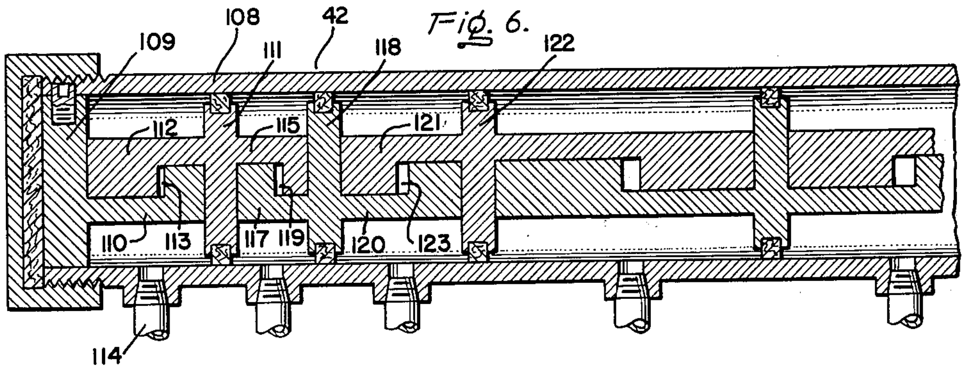
FIG. 6 is a diagrammatic, axial, sectional view of the base portion of a piston adder of the type shown in FIGS. 1 and 2.

Since the adder 42, which is shown diagrammatically in FIG. 6, is of a well known type, only a brief description thereof will be given herein. Said adder comprises a cylinder 108 with a plurality of pistons mounted therein. The pistons may be extended individually, or in any selected combination thereof, to produce a selected degree of extension of the piston rod 103 (FIG. 2) which is secured to a right hand piston (not shown) and extends from the cylinder 108 in FIG. 2.

A left hand, fixed, cylinder head 109 has an extension 110 thereon toward the right, as illustrated in FIG. 6, to limit movement of a first piston 111 toward the left. This extension 110 is in notched, overlapping relation with an oppositely directed similar extension 112 on the first piston 111. Overlapping notched portions of these two extensions 110 and 112 are spaced from each other at 113, in the left hand, or collapsed, limit of movement of the first piston 111, by a basic increment, which, in the present instance, is assumed to be the width of a track zone of the record, for example .006″. Thus the limit of movement of the first piston 111 toward the right from such collapsed position when pressurized fluid is introduced through a tube 114 into the space between the fixed cylinder head 109 and the first piston 111 is the length of this space, in this case .006″.

A similar notched extension 115 is fixedly secured to the right hand side of the first piston 111, and is in similar overlapping relation with a similar extension 117 from a second, similar piston 118. The notch faces of the latter two extensions are spaced apart at 119 by a distance equal to twice that of the basic increment at 113, or .012″. A third pair of similar overlapping extensions 120 and 121 are provided between the second piston 118 and a third piston 122 respectively, and the spacing at 123 between their notch faces is twice that at 119, or .024″, and so on, in binary sequence. Thus, by introducing pressurized fluid through selected tubes 114 to the interior of the cylinder 18 between selected pairs of the pistons herein, the piston rod 103 (FIG. 2) will be extended a distance equal to the sum of all of the inter-piston spaces into which such fluid has been introduced.

For actuating the adder 42 suitable means, such as a conventional, small, electrically driven hydraulic pump mechanism 124, and a conventional, electrically actuated, selective valve mechanism 125, may be provided in the rotor 23. Pressurized hydraulic fluid from the pump mechanism 124 may thus be introduced by means of the electrically actuated valves 125 to actuate the adders 42 as required.

Electrical current for actuating the various electrically energized elements of the rotor 23 may be conducted thereto by suitable conventional conducting means, such as, for example, conductors 127 (FIG. 1), brushes 128, and commutator rings 129.

It is contemplated that the mechanism A will eventually be provided with electrical and electronic address and other mechanisms (not shown) for automatically actuating and controlling the various parts of the mechanism in accordance with practices now followed with random access mechanisms employing rotating records and non-orbiting transducers. Since such actuating and control features are well known, and since they are not a part of the present invention, the illustrative mechanism A will be described as being manually operated.

The operation of the illustrated form of the invention is as follows:

With the magazine 12 loaded with a record 10 in each set of the notches 51 provided therefor, the rotor drive motor 37 is energized and rotates the rotor 23 continuously and at a constant speed throughout the operation of the mechanism. To select a required record, such as, for example, the record 10*a*, FIG. 1, the hydraulic cylinder 13 is actuated in the required direction by conventional hydraulic valves, not shown, to bring such selected record into approximate alignment with the record transfer tracks 17 and 18. The hydraulic detent actuating cylinder 14*a* is then actuated to urge the detent 14 forwardly into the V-tooth rack 54, thereby to accurately align such selected record with the tracks 17 and 18.

The elongated bases 71 of the record transfer wheel assemblies 21 are then all swung by energizing a selected set of the solenoids 44 to bring the record transfer wheels 72, turning in the desired direction, into frictional, driving engagement with the side edges of the selected record, and thereby advance such record along the tracks 17 and 18 into the record receiving notches 51 in the end mounted gripping jaws 24 of FIG. 1. With the selected record thus positioned, the orbiting light beam 30 will scan the central record opening 11, which will, at this stage, usually be positioned slightly eccentric to the rotor axis.

In such off-center position of the record, indicated by the doted line circle 89 of FIG. 7, the orbiting light beam 30 will energize the four solenoids 31, 32, 33 and 34 successively as indicated by the four segments *a′*, *b′*, *c′* and *d′* of the graph C of FIG. 9.

The short inter-pulse space 130 between the pulses *a′* and *b′* of FIG. 9 indicates (referring to FIG. 7) that this portion of the light beam orbit during which the beam is intercepted by the record, is shorter than the similar inter-pulse space 131 between the pulses *c′* and *d′* for the opposite side of the hole. This reading indicates that in order to center the record the latter should be moved toward the side thereof between the corner zones *a′* and *b′* of FIG. 7. Such movement of the record is accomplished by energizing the electromagnets 85 in the end gripping jaws 24 to grip the record 10*a* therebetween, and actuating the end hydraulic cylinder 25 in the required direction to move the record to centered condition.

When the inter-pulse space between the graph portions *a'* and *b'* equals that between *c'* and *d'* it indicates that the record is centered lengthwise of the bed plate 20. The record then may be centered laterally of the bed plate in a similar manner by means of the side gripping jaws 27 and their associated hydraulic cylinders 28. With the record thus centered to produce a pulse pattern such as that B shown in FIG. 8, the record is then drawn against the platen 22 by vacuumizing the platen pasages 55 as shown in FIG. 4.

The rotor 23 is then elevated to a position close to the platen 22 by actuating the hydraulic cylinder 70, and the transducers 49 and 50 are adjusted radially of the rotor 23 by means of the piston adder 42 to scan selected track zones (not shown) of the record. This adjustment of the transducers, as explained previously herein, is accomplished by admitting pressurized fluid from the compressor unit 124, through required valves of the valve mechanism 125 and tubes 114 to selected inter-piston spaces of the adder 42 to thereby project the adder piston rod 103 a distance equal to the sum of the selected space increments of the adder. The solenoids 44 are then energized to swing the springs 43 upwardly, thereby urging the bearing balls 45 against the under sides of their respective transducer supports 99 and 100 to bias the transducers therein into close, air bearing relation with the under side of the record 10*a*.

The transducers 49 and 50 then transmit or detect required information bits on their selected record tracks in a usual manner, after which the parts are returned to their original positions of FIGS. 1 and 3 by a reversal of the various steps described herein for bringing the transducers into operative relation with the record. The record is then returned to the magazine 12 by tilting the transfer wheel assemblies 21 in the opposite direction from that described for transferring the record into operative position beneath the platen 22, thereby bringing the oppositely rotating transfer wheels 73 into frictional, driving engagement with the side edges of the record.

The invention provides a simple, fast, random access mechanism of tremendous capacity. By providing a plurality of transducers in each rotor, and with two complete record processing mechanisms (FIG. 1) for each record magazine, it insures extremely high volume/time efficiency.

While the invention has been particularly shown and described with reference to a preferred embodiment thereof, it will be understood by those skilled in the art that various changes in form and details may be made therein without departing from the spirit and scope of the invention.

What is claimed is:

1. A random access file comprising a record magazine, a plurality of flat, magnetic coated records stored therein, a constantly rotating rotor laterally beyond said magazine, a transducer mounted on said rotor for orbiting in a plane about the axis of rotor rotation and co-axial therewith, means for transferring a selected one of said records from said magazine into a position parallel to the plane of transducer orbit with a magnetic coated side of such selected record facing said transducer, means for relatively moving such record and transducer to bring such magnetic coated side of such record into operative relation with said transducer, and means for moving the orbiting transducer to a selected radial distance from the axis of rotor rotation.

2. A random access file comprising a record magazine, a plurality of flat, magnetic coated records stored in known order therein, a constantly rotating rotor removed from said records, a transducer mounted at an end of said rotor for orbiting in a plane about the axis of rotor rotation, means for moving said magazine to position a selected one of said records adjacent the plane of orbit of said transducer, means for transferring a selected one of said records into a position parallel to the plane of transducer orbit with a magnetic coated side thereof facing said transducer, and means for relatively moving such record and transducer to bring such magnetic coated side of such record into operative relation with said transducer.

3. A random access file comprising a record magazine, a plurality of flat, magnetic coated records stored therein, each record having a plurality of concentric track zones on a magnetic coated side thereof, a constantly rotating rotor located laterally beyond said record magazine, a transducer mounted at an end of said rotor for orbiting in a plane about the axis of rotor rotation and co-axial therewith, means for transferring a selected one of said records from said magazine into a position parallel to the plane of transducer orbit with its magnetic coated side facing such plane, means for positioning such selected record with the common center of the track zones thereon coincident with the axis of rotor rotation, and in operative relation with said transducer, and means for moving the transducer to a selected radial distance from the axis of rotor rotation for orbiting along a record track zone at the same radial distance from the common center of such track zones.

4. A random access file comprising a record magazine, a plurality of flat, magnetic coated records stored therein, each record having a plurality of concentric track zones on a magnetic coated side thereof, a constantly rotating rotor located laterally beyond said magazine, a transducer mounted at an end of said rotor for orbiting in a plane about the axis of rotor rotation and co-axial therewith, means for transferring a selected one of said records from said magazine into a position parallel to the plane of transducer orbit, with a magnetic coated side thereof facing said transducer, means for adjusting such record to position the common center of the track zones thereon coincident with the axis of rotor rotation, means for relatively moving such record and transducer to bring such record into operative relation with said transducer, and means for moving the transducer to a selected radial distance from the axis of rotor rotation for orbiting along a record track zone at the same radial distance from the common center of such track zones.

5. A random access file comprising a record magazine, a plurality of flat, magnetic coated records stored therein, each record having a plurality of concentric track zones on a magnetic coated side thereof and having a hole centrally of such track zones thereon, a constantly rotating rotor located laterally beyond magazine, a transducer mounted at an end of said rotor for orbiting in a plane about the axis of rotor rotation and co-axial therewith, means for transferring a selected one of said records from said magazine into a position parallel to the plane of transducer orbit with a magnetic coated side thereof facing such plane, means for transferring such selected record from the magazine to a position substantially concentric with the rotor axis, hole-sensing means carried by the rotor for sensing any eccentricity of the common center of such hole and track zones of such record relative to the rotor axis, means for adjusting such record to position the common center of the track zones and hole thereof coincident with the axis of rotor rotation as indicated by the hole-sensing means, and means for moving the transducer to a selected radial distance from the axis of rotor rotation for orbiting along a record track zone at the same radial distance from the common center of such track zones.

6. A random access file comprising a record magazine, a plurality of flat, magnetic coated records, each having a hole centrally thereof and having a plurality of concentric track zones on a magnetic coated side thereof, such track zones being also concentric with such hole in the record, a constantly rotating rotor located laterally beyond said magazine, a transducer mounted at an end of said rotor for orbiting in a plane about the axis of rotor rotation and co-axial therewith, a light beam projector mounted to project a small diameter light beam beyond the axis of rotor rotation for interception by marginal portions of a record surrounding its center hole, photo-cell means for receiving the light beam when not so intercepted for disclosing any eccentricity of the record relative to the rotor axis, means for transferring a selected one of said records from the magazine into a position parallel to the plane of transducer orbit with its magnetic coated side facing the transducer, and substantially concentric with the rotor axis, fine adjusting means for selectively moving the record along two axes to bring the common center of the track zones and hole thereof coincident with the axis of rotor rotation as indicated by the photo cell means, and means for moving the transducer to a selected radial distance from the axis of rotor rotation for orbiting along a record track zone at the same radial distance from the common center of such track zones.

7. A random access file comprising storage means for a plurality of flat, magnetic coated records, each having a plurality of concentric track zones thereon, a transducer moving in an orbit located laterally beyond said storage means, means for transferring a selected record from a plurality thereof in said storage means into initially spaced relation to said orbiting transducer and substantially co-axial with the transducer orbit, means for accurately centering the track zones on the selected record co-axially with the transducer orbit, and means for relatively moving the record and transducer toward each other to bring the orbiting transducer into close, accurate, operative register with a selected track zone of the selected record.

8. A random access file comprising a storage magazine for storing a plurality of flat, magnetic coated records in superposed, spaced, parallel relation therein, said magazine being movable perpendicularly to the planes of the records therein, each of said records having a plurality of concentric track zones thereon, a transducer moving in an orbit laterally removed from such storage means, means for moving said magazine to position a selected record therein in a plane spaced slightly from the orbit of said transducer, means for transferring such selected record from the magazine along such plane to a position opposite sad orbiting transducer, means for accurately centering the track zones on such selected record co-axially with the transducer orbit, and means for relatively moving the record and transducer to bring the orbiting transducer into close, accurate, operative register with a selected track zone of the selected record.

9. A random access file comprising storage means for a plurality of flat, magnetic coated records, each having a plurality of concentric track zones thereon, a transducer moving in an orbit laterally removed from such storage means, a flat platen parallel to and spaced axially from the orbit of said transducer, means for transferring a selected record from a plurality thereof in said storage means into position between the platen and said orbiting transducer, means for accurately centering the track zones on the selected record co-axially with the transducer orbit, means for drawing such selected record into close, contacting relation with the platen, and means for moving the orbiting transducer into close, accurate, operative register with a selected track zone of such selected record.

References Cited in the file of this patent

UNITED STATES PATENTS 2,914,746 James ---------------- Nov. 24, 1959

FOREIGN PATENTS 213,527 Australia -------------- Feb. 24, 1958